US012500359B2

(12) United States Patent
Rhein et al.

(10) Patent No.: US 12,500,359 B2
(45) Date of Patent: Dec. 16, 2025

(54) ELECTRICAL SHIELD FOR AN ELECTRICAL CONNECTOR

(71) Applicant: TE Connectivity Solutions GmbH, Schaffhausen (CH)

(72) Inventors: David James Rhein, Memphis, MI (US); Thomas Robert DeWitte, Shelby Township, MI (US); Zoran Krnetic, Winston Salem, NC (US); Deborah J. Probert, Troy, MI (US)

(73) Assignee: TE CONNECTIVITY SOLUTIONS GMBH (CH)

( * ) Notice: Subject to any disclaimer, the term of this patent is extended or adjusted under 35 U.S.C. 154(b) by 552 days.

(21) Appl. No.: 18/081,724

(22) Filed: Dec. 15, 2022

(65) Prior Publication Data

US 2024/0204427 A1 Jun. 20, 2024

(51) Int. Cl.
*H01R 4/2407* (2018.01)
*H01R 4/2416* (2018.01)

(52) U.S. Cl.
CPC ......... *H01R 4/2407* (2018.01); *H01R 4/2416* (2013.01); *H01R 2201/26* (2013.01)

(58) Field of Classification Search
CPC ........... H01R 13/5202; H01R 13/6582; H01R 13/74; H01R 4/26; H01R 13/6596; H01R 2013/648; H01R 13/02; H01R 13/648; H01R 4/2416; H01R 4/2407
See application file for complete search history.

(56) References Cited

U.S. PATENT DOCUMENTS

| | | | | |
|---|---|---|---|---|
| 5,116,230 | A * | 5/1992 | Dechelette | H01R 13/6592 439/101 |
| 10,148,041 | B2 | 12/2018 | Lyon et al. | |
| 2016/0240986 | A1* | 8/2016 | Bragg | H01R 13/4536 |
| 2023/0282990 | A1 | 9/2023 | Mellott | |

* cited by examiner

*Primary Examiner* — Jean F Duverne

(57) ABSTRACT

An electrical connector includes a housing having a mounting end configured to be mounted to a structure. The electrical connector includes an electrical shield having shield walls surrounding a shield cavity. The shield walls are coupled to the housing and provide electrical shielding for the housing. The electrical shield includes grounding tabs extending from the shield walls. The grounding tabs include teeth having cutting edges. The grounding tabs are received in the opening in the structure. The teeth of the grounding tabs configured to engage the structure to electrically ground the grounding tabs to the structure. The cutting edges configured to cut through a coated surface of the structure to directly engage a conductive layer of the structure to electrically connect the electrical shield to the structure through the coated surface.

20 Claims, 8 Drawing Sheets

ELECTRICAL SHIELD FOR AN ELECTRICAL CONNECTOR

BACKGROUND OF THE INVENTION

The subject matter herein relates generally to electrical connectors.

Many known electrical components provide shielding. For example, electrical connectors, such as power connectors, may include electrical shields used to electrically common with other electrical connectors or other grounded components. Some known connectors that use electrical shields are power connectors, such as those used to make a power connection between components in high power applications, such as in electric or hybrid electric vehicles between the battery and other components, such as the electric motor, the inverter, the charger, and the like.

It is generally desirable to have the electrical shields grounded. For example, the electrical connector may be mounted to a structure, such as a chassis or other main supporting structure that is conductive. The electrical shield may be electrically connected to the conductive structure. However, in some applications, such as automotive applications, the conductive structure is coated or painted with a coating layer over the conductive layer. For example, the structure may be e-coated. The coating layer is typically non-conductive or significantly less conductive than the conductive layer, and thus is unsuitable for electrical connection with the shield of the electrical connector. It is difficult to provide sufficient electrical connection between the electrical shield of the connector and the coated structure.

A need remains for a connector system having components for electrically commoning an electrical shield of a component to a coated conductive structure.

BRIEF DESCRIPTION OF THE INVENTION

In one embodiment, an electrical connector is provided and includes a housing having a mounting end configured to be mounted to a structure. The mounting end of the housing is received in an opening in the structure. The electrical connector includes an electrical shield having shield walls surrounding a shield cavity. The shield cavity receives the housing. The shield walls are coupled to the housing and provide electrical shielding for the housing. The electrical shield includes grounding tabs extending from the shield walls. The grounding tabs include teeth having cutting edges. The grounding tabs are received in the opening in the structure. The teeth of the grounding tabs configured to engage the structure to electrically ground the grounding tabs to the structure. The cutting edges configured to cut through a coated surface of the structure to directly engage a conductive layer of the structure to electrically connect the electrical shield to the structure through the coated surface.

In another embodiment, an electrical connector is provided and includes a housing having a mounting end configured to be mounted to a top surface of a structure. The mounting end of the housing is received in an opening in the structure defined by an opening edge surrounding a perimeter of the opening and extending between a bottom surface and the top surface of the structure. The electrical connector includes a terminal coupled to the housing. The electrical connector includes an electrical shield having shield walls surrounding a shield cavity. The shield cavity receives the terminal. The shield walls are coupled to the housing and provide electrical shielding for the terminal. The electrical shield includes grounding tabs extending from the shield walls. The grounding tabs include teeth having cutting edges. The grounding tabs are received in the opening in the structure. The teeth of the grounding tabs configured to engage the opening edge between the top surface and the bottom surface of the structure to electrically ground the grounding tabs to the structure. The cutting edges configured to cut through a coated surface of the structure to directly engage a conductive layer of the structure between the top surface and the bottom surface to electrically connect the electrical shield to the structure through the coated surface.

In a further embodiment, an electrical connector is provided and includes a housing having a mounting end configured to be mounted to a top surface of a structure. The mounting end of the housing is received in an opening in the structure defined by an opening edge surrounding a perimeter of the opening. The electrical connector includes a terminal coupled to the housing. The electrical connector includes an electrical shield having shield walls surrounding a shield cavity. The shield cavity receives the terminal. The shield walls are coupled to the housing and provide electrical shielding for the terminal. The electrical shield includes grounding tabs extending from the shield walls. The grounding tabs include teeth has cutting edges. The grounding tabs are received in the opening in the structure. The teeth of the grounding tabs configured to engage the top surface of the structure proximate to the opening edge to electrically ground the grounding tabs to the structure. The cutting edges configured to cut through a coated surface of the structure to directly engage a conductive layer of the structure at the top surface to electrically connect the electrical shield to the structure through the coated surface.

DETAILED DESCRIPTION OF THE INVENTION

Figure 1A:
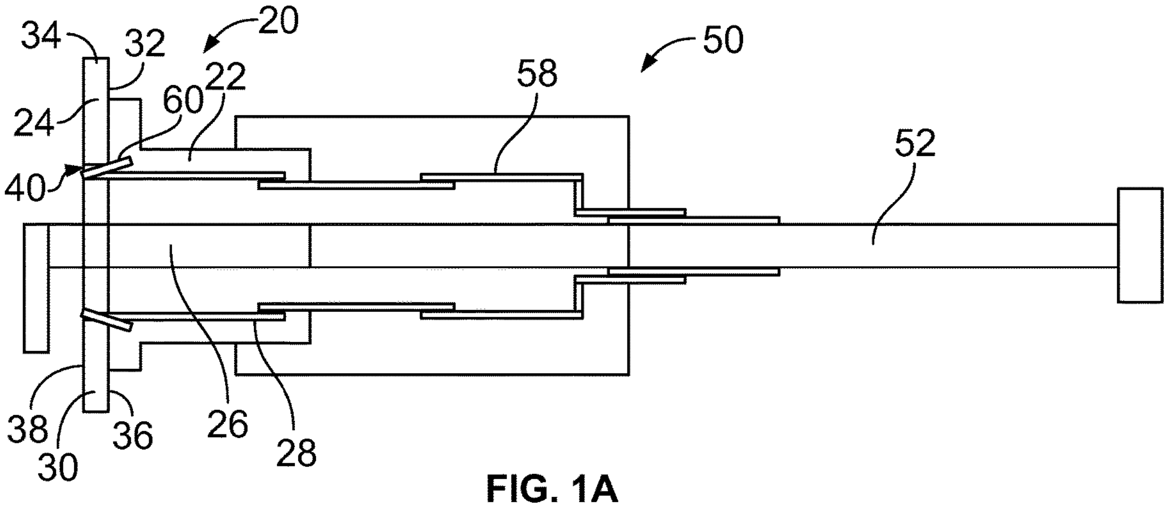
FIG. 1A is a schematic illustration of an electrical component electrically grounded to a structure in accordance with a first grounding scheme in accordance with an exemplary embodiment.
Figure 1B:
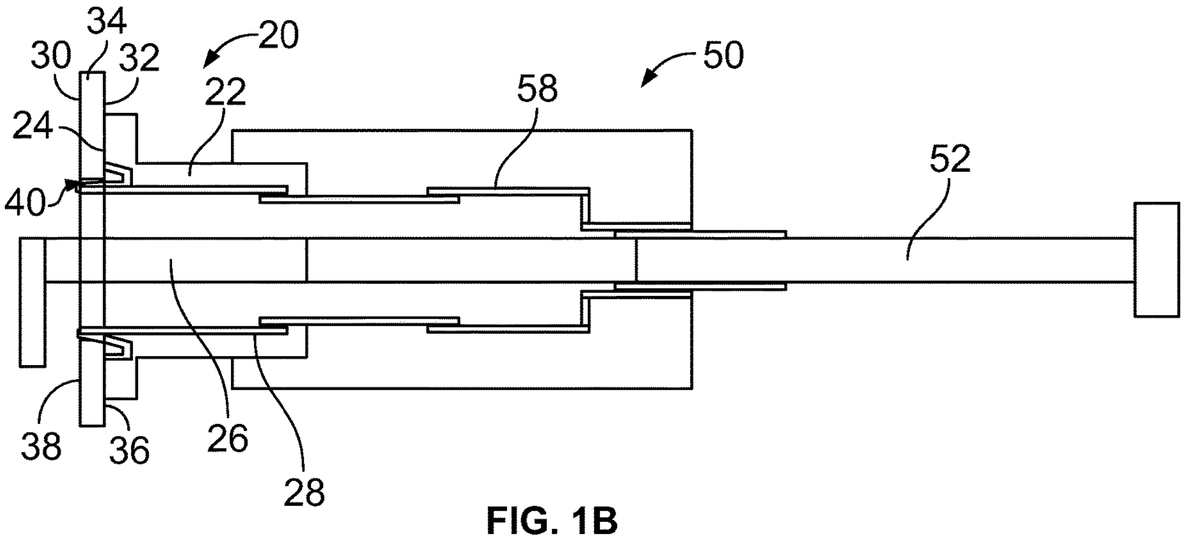
FIG. 1B is a schematic illustration of the electrical component electrically grounded to the structure in accordance with a second grounding scheme in accordance with an exemplary embodiment.
Figure 1C:
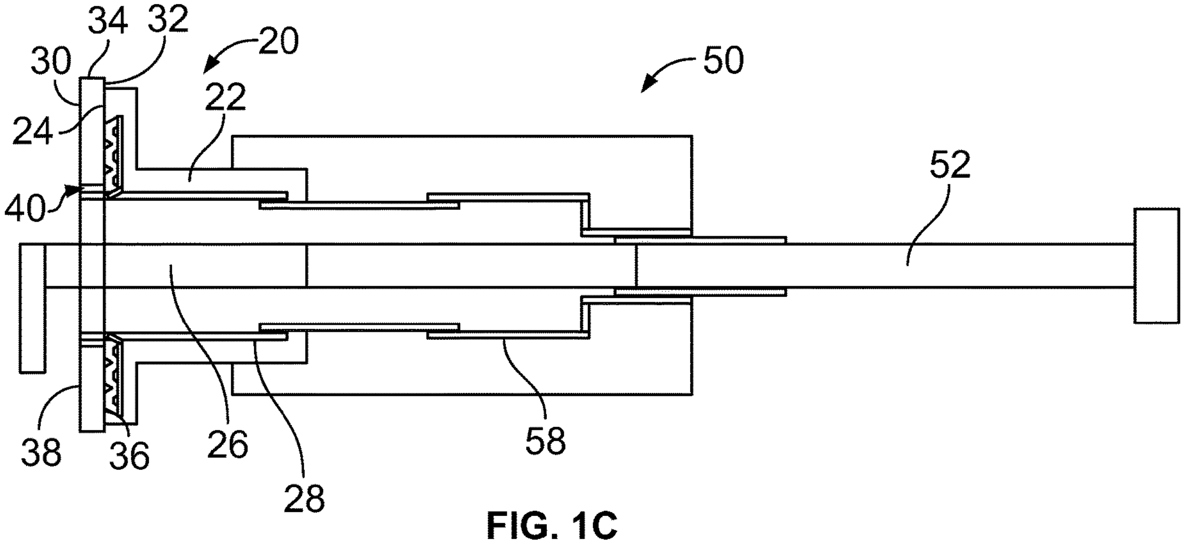
FIG. 1C is a schematic illustration of the electrical component electrically grounded to the structure in accordance with a third grounding scheme in accordance with an exemplary embodiment.

FIG. 1A is a schematic illustration of an electrical component 20 electrically grounded to a structure 30 in accordance with a first grounding scheme. FIG. 1B is a schematic illustration of the electrical component 20 electrically grounded to the structure 30 in accordance with a second grounding scheme. FIG. 1C is a schematic illustration of the electrical component 20 electrically grounded to the structure 30 in accordance with a third grounding scheme.

The structure 30 is conductive. For example, the structure 30 may be manufactured from a metal material. In an exemplary embodiment, the structure 30 is a coated structure wherein an outer layer of the structure 30 is a coated layer or coated surface 32 provided on a conductive layer 34 of the structure 30. For example, the coated surface 32 may be an electro-deposited e-coat on the conductive layer 34. The coated surface 32 may be painted on the conductive layer 34, such as through electro-painting or by other application processes. The coated surface 32 protects the structure 30 by covering the conductive layer 34. In an exemplary embodiment, the coated surface 32 is provided on a top 36 of the structure 30 and may additionally or alternatively be provided on a bottom 38 of the structure 30.

The electrical component 20 is mounted to the structure 30, such as to the top 36 of the structure 30. In an exemplary embodiment, the electrical component 20 is mounted to the structure 30 at an opening 40 in the structure 30. A portion of the electrical component 20 may extend into the opening 40. A portion of the electrical component 20 may pass through the opening 40, such as below the bottom 38 of the structure 30. The electrical component 20 may be any type of electrical component, such as an electrical connector. The electrical component 20 may include a housing 22 having a mounting end 24 configured to be mounted to the structure 30. Optionally, the electrical component 20 may hold one or more terminals 26 in the housing 22. The terminals 26 are configured to be electrically connected with another component, such as a mating connector 50. The mating connector 50 may be a cable connector terminated to an end of a cable 52.

In an exemplary embodiment, the electrical component 20 includes an electrical shield 28 held by the housing 22 and providing electrical shielding for the electrical component 20, such as for the one or more terminals 26. The electrical shield 28 is configured to be electrically grounded to the structure 30. The electrical shield 28 may be electrically connected to an electrical shield 58 of the mating connector 50. In an exemplary embodiment, the electrical shield 28 includes one or more grounding features 60 configured to be electrically connected to the conductive layer 34 of the structure 30 to electrically connect the shield 28 to the structure 30 through the coated surface 32. In an exemplary embodiment, the grounding features 60 include teeth configured to cut or pierce through the coated surface 32 to directly engage the conductive layer 34 of the structure 30. The grounding features 60 may wipe along the coated layer to remove the coated layer and expose the conductive layer 34 to electrically connect to the conductive layer.

In an exemplary embodiment, when the electrical component 20 is mounted to the structure 30, the grounding features 60 may be pressed into the structure 30 and cut through the coated surface 32 to directly engage the conductive layer 34 to electrically connect the shield 28 to the structure 30 through the coated surface 32. In the first grounding scheme (FIG. 1A), the grounding features 60 engage the structure 30 within the opening 40. The grounding features 60 press outward against the edge of the opening to electrically connect to the conductive layer 34 within the opening 40, such as between the top surface and the bottom surface of the structure 30. In the second grounding scheme (FIG. 1B), the grounding features 60 engage the structure 30 at the top surface immediately adjacent the opening 40. The grounding features 60 press downward against the top surface at the edge of the opening 40 to electrically connect to the conductive layer 34. In the third grounding scheme (FIG. 1C), the grounding features 60 engage the structure 30 at the top surface proximate to the opening 40. The grounding features 60 extend outward across the top surface. The grounding features 60 may be pressed downward against the top surface to electrically connect to the conductive layer 34.

Figure 2:
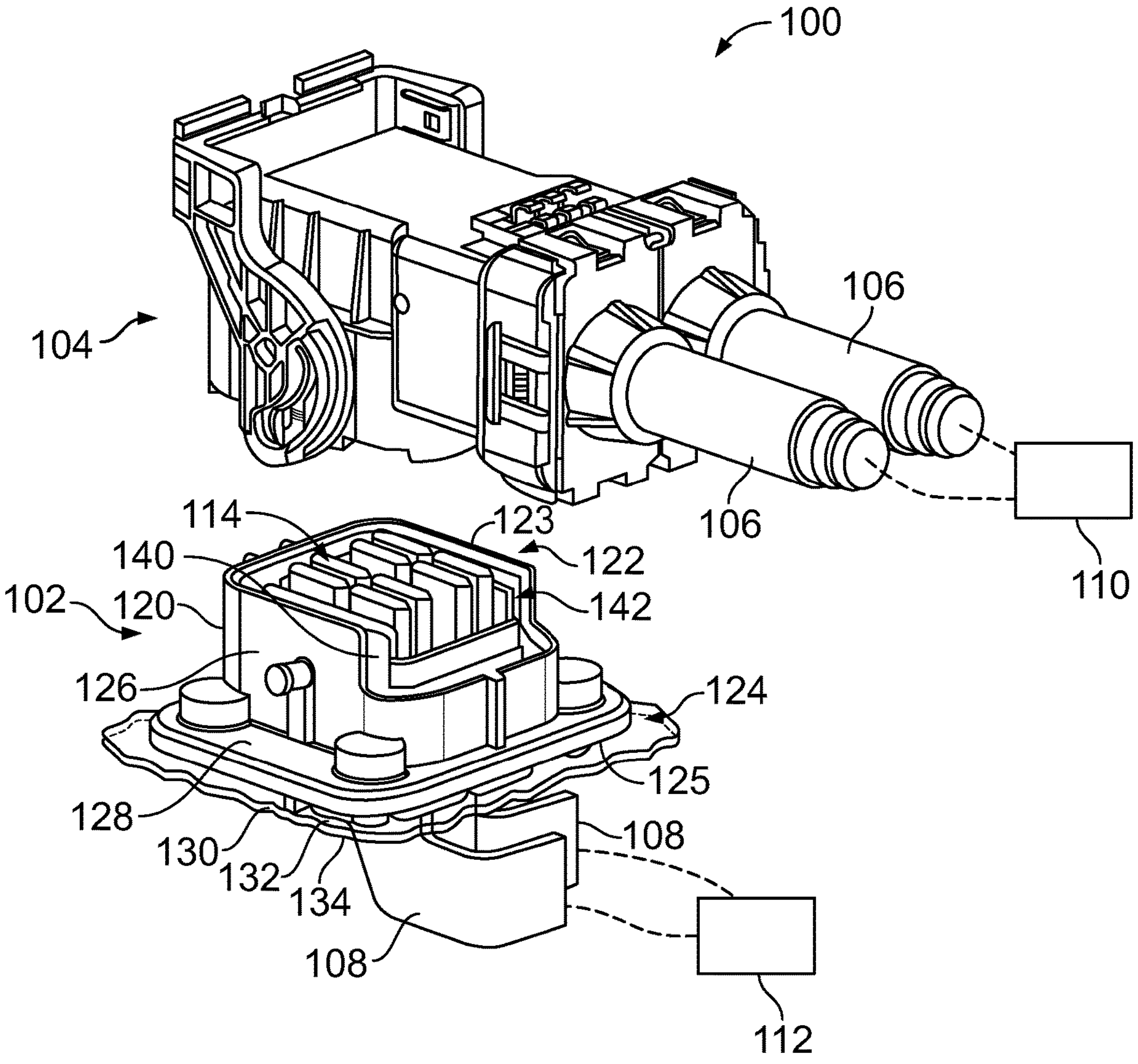
FIG. 2 is a perspective view of a power connector system utilizing grounding features in accordance with an exemplary embodiment.

FIG. 2 is a perspective view of a power connector system 100 utilizing grounding features in accordance with an exemplary embodiment. The power connector system 100 is an exemplary system utilizing the grounding features and the subject matter herein is not intended to be limited to use with the illustrated power connector system 100.

The power connector system 100 includes a header connector 102 and a plug connector 104 configured to be mated with the header connector 102. The plug connector 104 is shown poised for mating with the header connector 102. The header connector 102 is mounted to the structure 30, such as at the opening 40 (shown in FIG. 1A). In an exemplary embodiment, the structure 30 is conductive. For example, the structure 30 may be manufactured from a metal material, such as steel. In an exemplary embodiment, the structure 30 is a coated structure wherein an outer layer of the structure 30 is a coated layer. The coated surface 32 is provided on the conductive layer 34 of the structure 30. In various embodiments, the coated surface 32 may be an electrodeposited e-coat on the conductive layer 34. The coated surface 32 may be painted on the conductive layer 34, such as through electro-painting or by other application processes. The coated surface 32 protects the structure 30, such as from corrosion, by covering the conductive layer 34. Optionally, the header connector 102 may be mounted horizontally; however, other orientations are possible in alternative embodiments. Fasteners may be used to mount the header connector 102 to the structure 30.

In an exemplary embodiment, the power connector system 100 is a high power connector system that is used to transfer power between various components as part of a high power circuit. In a particular application, the power connector system 100 is a battery system, such as a battery system of a vehicle, such as an electric vehicle or hybrid electric vehicle; however the power connector system 100 is not intended to be limited to such battery systems.

The plug connector 104 is configured to be electrically connected to a component 110, such as through one or more power cables 106. For example, the plug connector 104 may be electrically connected to a battery, a charger, an inverter, an electric motor or another type of component. The header connector 102 is configured to be electrically connected to a component 112, such as through a power bus 108; however the header connector 102 may be electrically connected to the component 112 by other means, such as a terminal, power wire or other connector. For example, the header connector 102 may be electrically connected to a battery pack, such as through a battery distribution unit, a manual service disconnect, a charger, an inverter, an electric motor, or another type of component. The battery distribution unit may manage the power capacity and functionality of the power connector system 100, such as by measuring current and regulating power distribution of the battery pack.

The power connector system 100 is a right angle connector system where the connectors 102, 104 are mated in a direction perpendicular to the power wires. Optionally, the plug connector 104 may be removably coupled to the header connector 102 to disconnect the high power circuit of one or more of the components, such as the battery pack, the electric motor, the inverter, or other components of the vehicle, such as for maintenance, repair or for another reason. When mated, one or more header terminals 114 of the header connector 102 are mated with corresponding plug terminals (not shown) of the plug connector 104, such as at mating interfaces thereof.

The header connector 102 includes a header housing 120 having a mating end 122 at a top 123 of the header housing 120 and a mounting end 124 at a bottom 125 of the header housing 120. The header housing 120 includes shroud walls 126 extending to the top 123. The header housing 120 holds the header terminals 114. Optionally, the header terminals 114 may be fork terminals having sockets defined by spring beams on both sides of the sockets to mate with both sides of the plug terminal; however, other types of header terminals 114 may be used in alternative embodiments, such as blade terminals.

The header housing 120 includes a flange 128 at the mounting end 124 for mounting the header housing 120 to the structure 30, such as a chassis or other supporting structure. The flange 128 may be separate from the shroud walls 126 or may be integral with the shroud walls 126.

The header housing 120 includes an electrical shield 140 to provide electrical shielding for the header terminals 114. The shield 140 may be connected to the plug connector 104 to electrically common the header connector 102 and the plug connector 104. Optionally, the header connector 102 may be electrically grounded to the structure 30. For example, the shield 140 may be electrically connected to the structure 30. The shield 140 is configured to pierce or cut through the coated surface 32 to directly engage the conductive layer 34 to provide a reliable electrical connection with the structure 30. The shield 140 may extend into the opening 40 in the structure for connection to the structure 30. The shield 140 may extend along the flange 128 for connection to the structure 30.

The header housing 120 defines a header chamber 142 configured to receive a portion of the plug connector 104. For example, the header chamber 142 may be defined by walls of the header housing 120. The shield 140 may extend into the chamber 142 to provide electrical shielding for the header terminals 114 and/or for mating with the plug connector 104.

Figure 3:
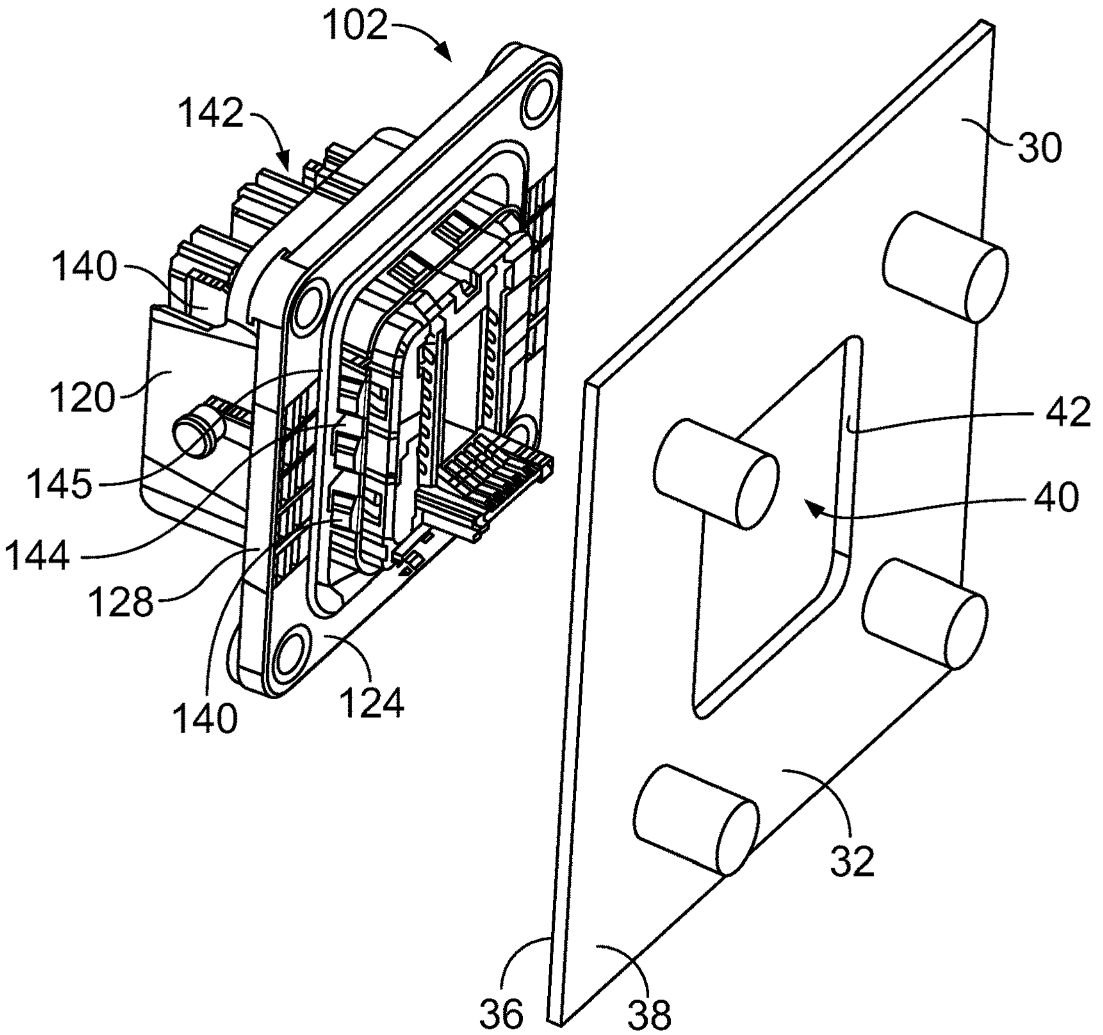
FIG. 3 is an exploded, perspective view of the header connector poised for mounting to the structure in accordance with an exemplary embodiment.
Figure 4:
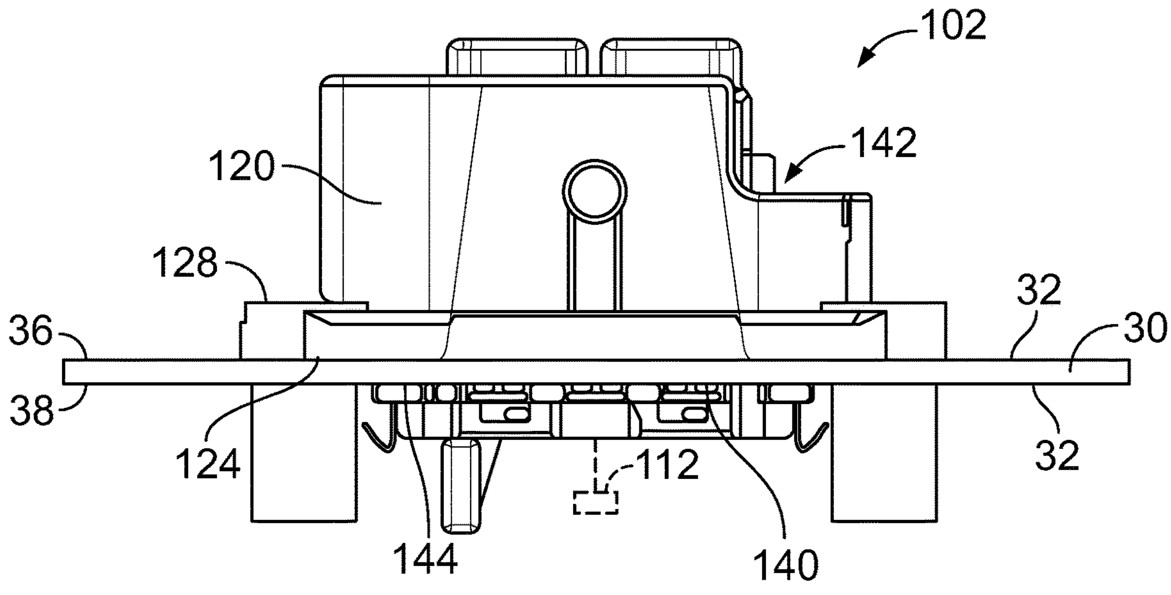
FIG. 4 is a side view of the header connector mounted to the structure in accordance with an exemplary embodiment.

FIG. 3 is an exploded, perspective view of the header connector 102 poised for mounting to the structure 30. FIG. 4 is a side view of the header connector 102 mounted to the structure 30. The header connector 102 is aligned with the opening 40 in the structure 30. The opening 40 passes through the structure 30 between the top 36 and the bottom 38. The opening 40 is defined by an opening edge 42 that surrounds the perimeter of the opening 40. In the illustrated embodiment, the opening 40 is generally rectangular. However, the opening 40 may have other shapes in alternative embodiments. In an exemplary embodiment, the top 36, the bottom 38, and the opening edge 42 are all covered by the coated surface 32.

Components of the header connector 102 may pass through the opening 40 to electrically connect to the component 112 behind the structure 30. During assembly, a portion of the header connector 102 is loaded into the opening 40. For example, the header housing 120 includes a lip 144 at the mounting end 124 that extends below the flange 128. The lip 144 surrounds the bottom portion of the header chamber 142. The lip 144 is configured to be received in the opening 40. Other portions of the header connector 102 may pass through the opening 40, such as the header terminals 114. Alternatively, portions of the component, such as a busbar, may pass upward through the opening 40 to interface with the header terminals 114.

In an exemplary embodiment, the electrical shield 140 extends along the lip 144. For example, the electrical shield 140 may extend along an interior surface of the lip 144 and an exterior surface of the lip 144. The electrical shield 140 is configured to interface with the structure 30 at the opening 40. For example, the electrical shield 140 may engage the opening edge 42 and/or the top 36 and/or the bottom 38.

In an exemplary embodiment, the header connector 102 includes a seal 143 at the mounting end 124. The seal 143 is coupled to the bottom of the header housing 120, such as along the flange 128. The seal 143 is configured to be sealed against the top 36 of the structure 30.

Figure 5:
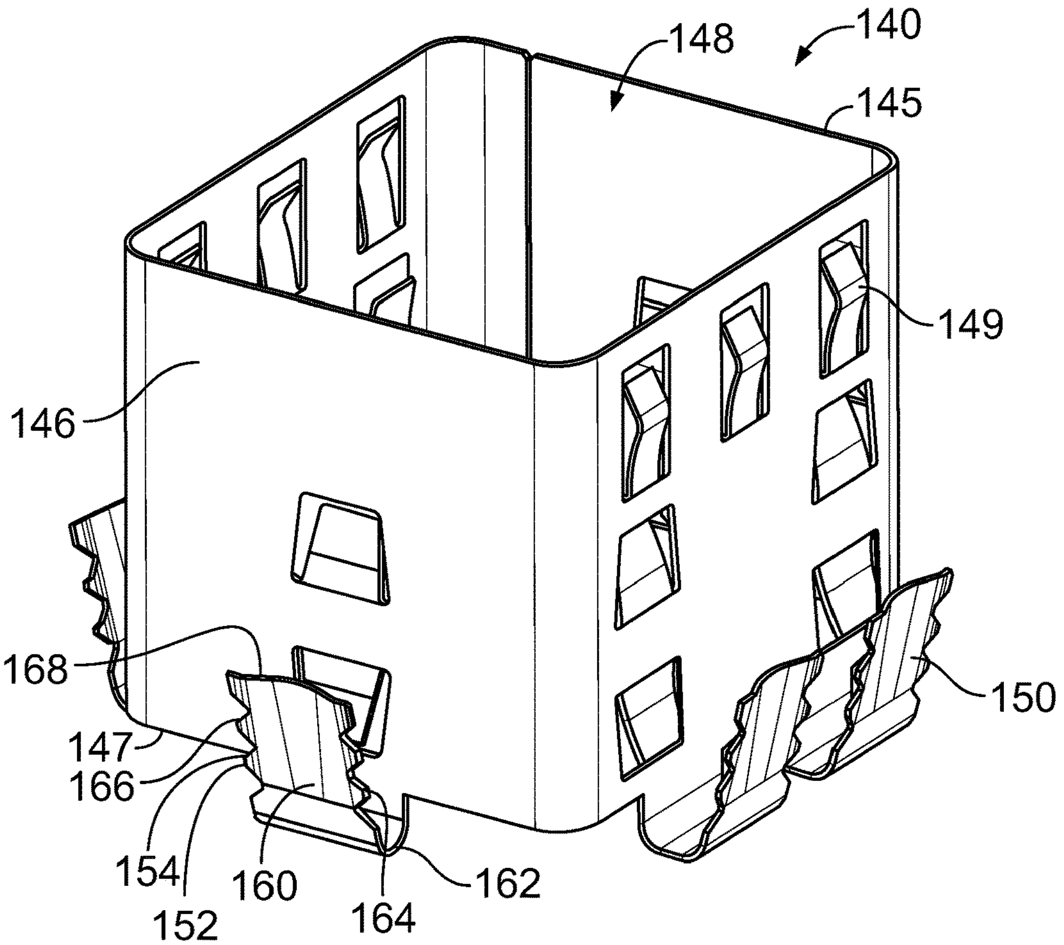
FIG. 5 is a perspective view of the electrical shield in accordance with an exemplary embodiment.

FIG. 5 is a perspective view of the electrical shield 140 in accordance with an exemplary embodiment. The electrical shield 140 is configured to be used in the first grounding scheme (FIG. 1A) in the illustrated embodiment. The electrical shield 140 is configured to be coupled to the header housing 120 (shown in FIG. 2). The electrical shield 140 is configured to provide electrical shielding for the header terminals 114 (shown in FIG. 2) held by the header housing 120. The electrical shield 140 is configured to be electrically connected to the plug connector 104 (shown in FIG. 2). The electrical shield 140 is configured to be electrically connected to the structure 30 (shown in FIG. 2).

The electrical shield 140 includes shield walls 146 forming a shield cavity 148. The shield walls 146 extend between a top 145 and a bottom 147 of the electrical shield 140. The shield cavity 148 is open at the top 145 and open at the bottom 147. In the illustrated embodiment, the shield walls 146 form a box around the shield cavity 148. For example, the electrical shield 140 is generally rectangular shaped. However, the electrical shield 140 may have other shapes in alternative embodiments. In an exemplary embodiment, the electrical shield 140 includes a plurality of connecting beams 149 extending from the shield walls 146. The connecting beams 149 are configured to be electrically connected to the plug connector 104 when the plug connector 104 is coupled to the header connector 102. The connecting beams 149 are deflectable spring beams.

In an exemplary embodiment, the electrical shield 140 includes a plurality of grounding tabs 150 extending from the shield walls 146. The grounding tabs 150 extend from the bottom edges of the shield walls 146. The grounding tabs 150 extend outward from the shield walls 146. Optionally, each shield wall 146 may include multiple grounding tabs 150.

In an exemplary embodiment, the grounding tabs 150 include teeth 152 having cutting edges 154. The cutting edges 154 of the teeth 152 are configured to cut through the coated surface 32 of the structure 30 to directly engage the conductive layer 34 of the structure 30 to electrically connect the electrical shield 140 to the structure 30 through the coated surface 32. In the illustrated embodiment, the teeth 152 are triangular shaped having a point. The cutting edges 154 may extend along one or both angled sides of each tooth and/or may extend to the point. The edges and/or the point may pierce or cut through the coated surface 32 to directly engage the conductive layer 34. In an exemplary embodiment, each grounding tab 150 includes a plurality of the teeth 152 to potentially have multiple points of contact between each grounding tab 150 and the structure 30.

In an exemplary embodiment, each grounding tab 150 includes a main body 160 and a connecting portion 162 between the main body 160 and the shield wall 146. The teeth 152 extend from the main body 160. In various embodiments, the connecting portion 162 is U-shaped having a downwardly projecting section, a horizontally projecting section, and an upwardly projecting section wherein the downwardly projecting section and the upwardly projecting section at approximately equal lengths. In other various embodiments, the connecting portion 162 is J shaped having a downwardly projecting section, a horizontally projecting section, and an upwardly projecting section wherein the upwardly projecting section is longer than the downwardly projecting section to locate the main body 160 at a height vertically above the bottom edge of the shield wall 146. The connecting portion 162 may have other shapes in alternative embodiments.

The main body 160 includes a first side edge 164 and a second side edge 166 extending to a distal edge 168 opposite the connecting portion 162. In various embodiments, the main body 160 is generally planar. However, in alternative embodiments, the main body 160 may be curved with the first and second side edges 164, 166 bowed outward, such as to interface with the structure 30. In an exemplary embodiment, the teeth 152 extending along the side edges 164, 166. The teeth 152 may be bent outward relative to the main body 160 of the grounding tab 150 to interface with the structure 30. For example, the teeth 152 may be angled outward relative to main body 160 of the grounding tab 150 and oriented nonparallel to the main body 160 of the grounding tab 150.

Optionally, the teeth 152 may additionally or alternatively extend along the distal edge 168. In various embodiments, the main body 160 may be folded over at the distal edge 168 such that the distal edge 168 is downward facing and includes a plurality of the teeth 152 configured to dig downward into the structure 30 to pierce the coated surface 32 when the header connector 102 is coupled to the structure 30. The electrical shield 140 may thus be additionally configured to be used in the second grounding scheme (FIG. 1B) in such embodiment.

Figure 6:
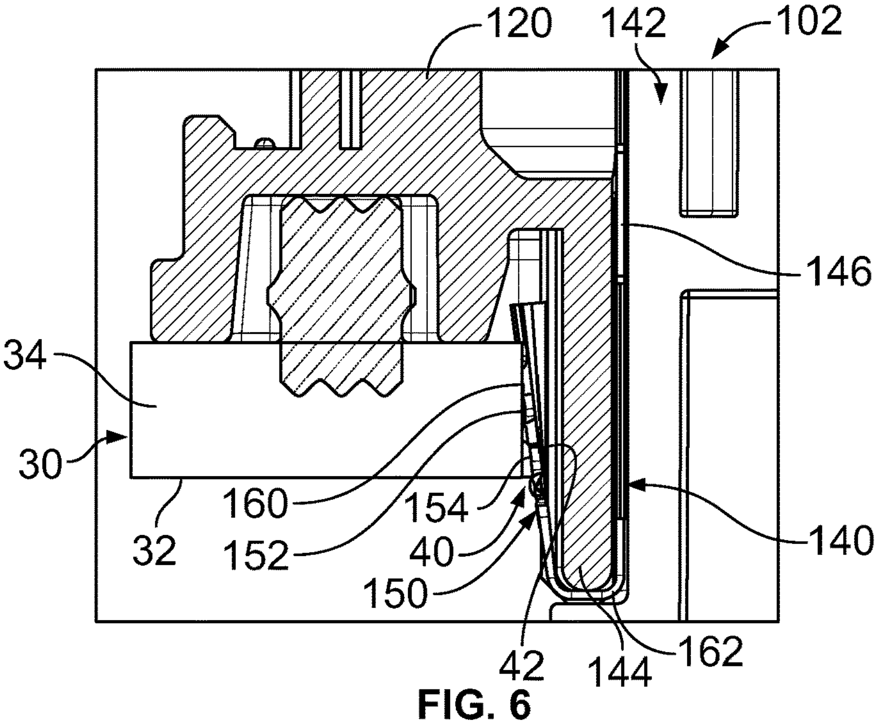
FIG. 6 is a cross-sectional view of a portion of the header connector mounted to the structure showing the electrical shield interfacing with the structure in accordance with an exemplary embodiment.

FIG. 6 is a cross-sectional view of a portion of the header connector 102 mounted to the structure 30 showing the electrical shield 140 interfacing with the structure 30 in accordance with an exemplary embodiment. The electrical shield 140 is grounded to the structure 30. For example, the electrical shield 140 is configured to pierce or cut through the coated surface 32 to directly engage the conductive layer 34 to provide a reliable electrical connection with the structure 30.

The electrical shield 140 is coupled to the header housing 120. In an exemplary embodiment, the electrical shield 140 is located in the header chamber 142. The shield walls 146 of the electrical shield 140 extend along inner surfaces of the walls of the header housing 120 defining the header chamber 142. The shield walls 146 may extend along the interior surface of the lip 144 at the bottom of the header housing 120. In an exemplary embodiment, the grounding tabs 150 extend along the lip 144 of the header housing 120. For example, the connecting portion 162 wraps around the bottom edge of the lip 144 to position the main body 160 of the grounding tab 150 along the exterior of the lip 144. The grounding tab 150 is located between the lip 144 of the header housing 120 and the structure 30. For example, the grounding tab 150 extends into the opening 40 and is located between the opening edge 42 and the header housing 120.

In an exemplary embodiment, the teeth 152 of the grounding tab 150 engage the structure 30 at the opening edge 42. For example, as the header connector 102 is coupled to the structure 30, the bottom of the header connector 102 is loaded through the opening 40. The grounding tab 150 slide or wipes along the opening edge 42 as the header connector 102 is loaded through the opening 40. The teeth 152 wipe along the opening edge 42 and the cutting edges 154 pierce the coated surface 32 to directly engage the conductive layer 34. In an exemplary embodiment, a plurality of the teeth 152 are located in the opening 40 and engage the structure 30 at the opening edge 42. In an exemplary embodiment, the grounding tab 150 is spring biased outward against the opening edge 42. For example, the header housing 120 presses the grounding tab 150 outward to press the teeth 152 in a pressing direction toward the structure 30.

Figure 7:
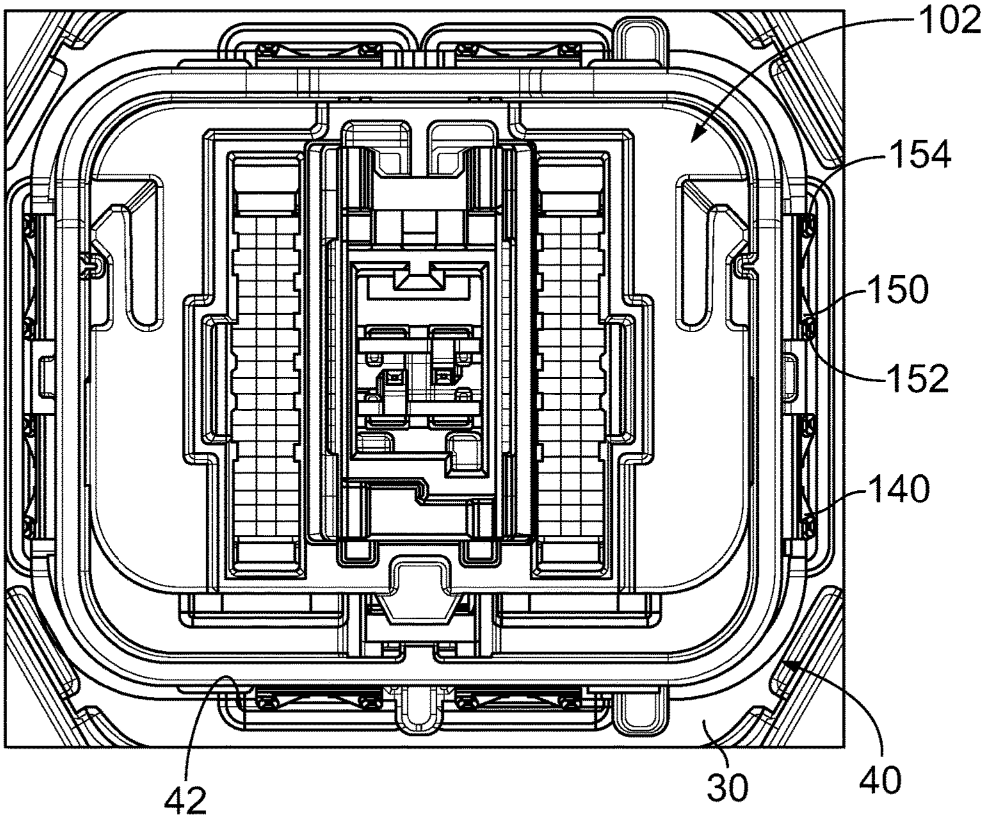
FIG. 7 is a bottom view of the header connector mounted to the structure showing the electrical shield interfacing with the structure in accordance with an exemplary embodiment.
Figure 8:
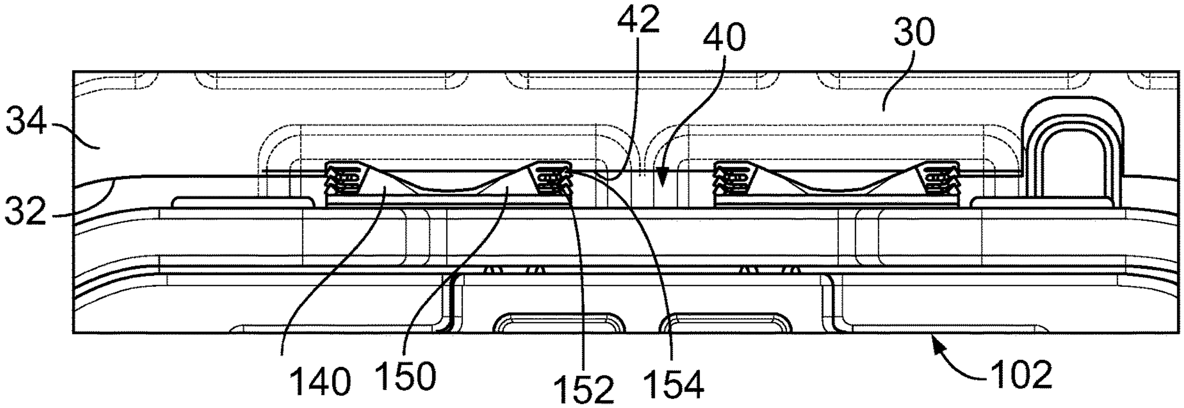
FIG. 8 is a bottom view of a portion of the header connector mounted to the structure in accordance with an exemplary embodiment.

FIG. 7 is a bottom view of the header connector 102 mounted to the structure 30 showing the electrical shield 140 interfacing with the structure 30 in accordance with an exemplary embodiment. FIG. 8 is a bottom view of a portion of the header connector 102 mounted to the structure. The electrical shield 140 is grounded to the structure 30. For example, the electrical shield 140 is configured to pierce or cut through the coated surface 32 to directly engage the conductive layer 34 to provide a reliable electrical connection with the structure 30. The teeth 152 of the grounding tab 150 engage the structure 30 at the opening edge 42. The teeth 152 wipe along the opening edge 42 and the cutting edges 154 pierce the coated surface 32 to directly engage the conductive layer 34. In an exemplary embodiment, a plurality of the grounding tabs 150 are located in the opening 40, such as along each side of the opening to interface with the structure 30 at the opening edge 42.

Figure 9:
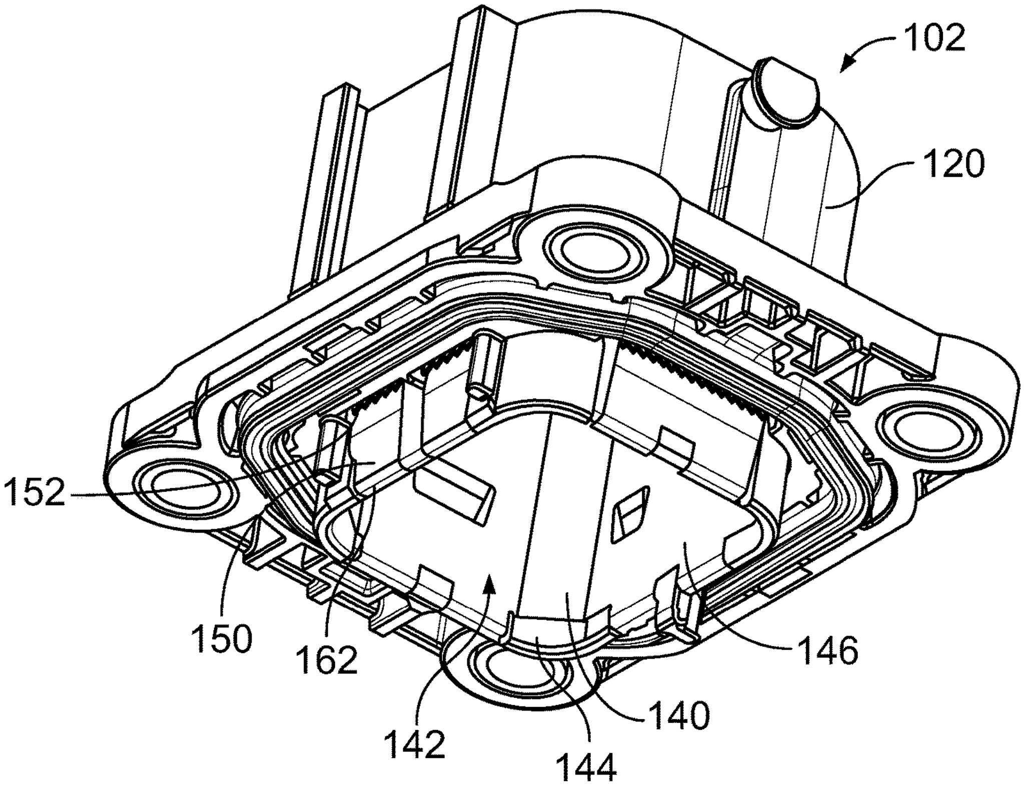
FIG. 9 is a bottom perspective view of a portion of the header connector in accordance with an exemplary embodiment showing the electrical shield coupled to the header housing.
Figure 10:
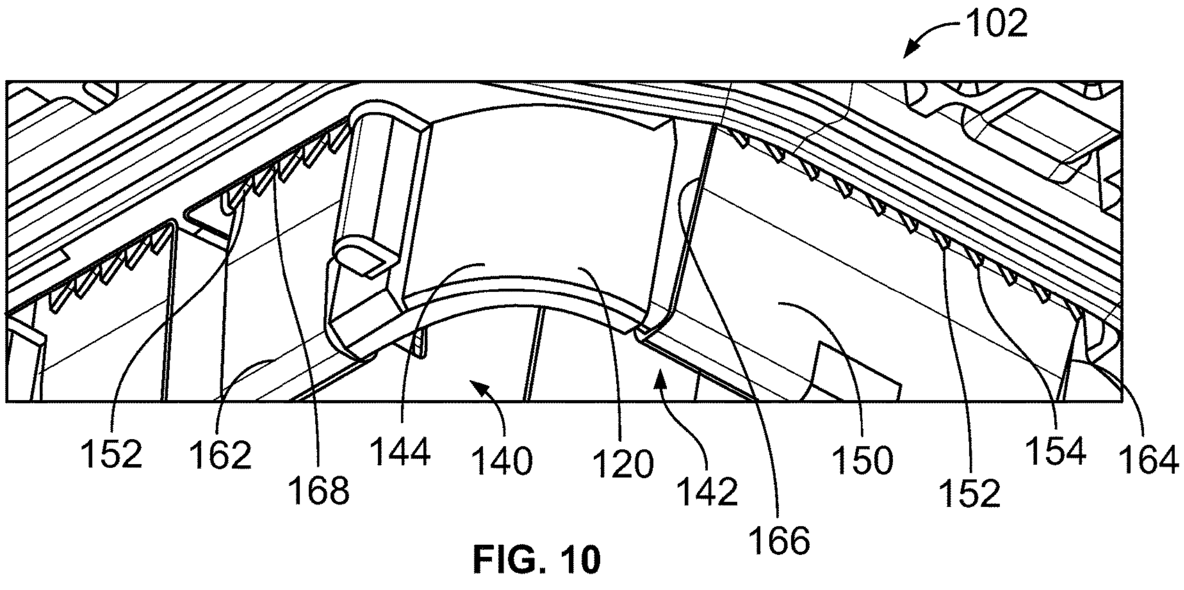
FIG. 10 is a bottom perspective view of a portion of the header connector in accordance with an exemplary embodiment showing the electrical shield coupled to the header housing.

FIG. 9 is a bottom perspective view of a portion of the header connector 102 in accordance with an exemplary embodiment showing the electrical shield 140 coupled to the header housing 120. FIG. 10 is a bottom perspective view of a portion of the header connector 102 in accordance with an exemplary embodiment showing the electrical shield 140 coupled to the header housing 120. The electrical shield 140 is configured to be used in the second grounding scheme (FIG. 1B) in the illustrated embodiment.

In an exemplary embodiment, the electrical shield 140 is located in the header chamber 142. The shield walls 146 of the electrical shield 140 extend along inner surfaces of the walls of the header housing 120 defining the header chamber 142. The shield walls 146 extend along the interior surface of the lip 144 at the bottom of the header housing 120. In an exemplary embodiment, the grounding tabs 150 extend along the lip 144 of the header housing 120. For example, the connecting portion 162 wraps around the bottom edge of the lip 144.

The grounding tabs 150 include the teeth 152 having the cutting edges 154. In the illustrated embodiment, the teeth 152 are provided at the distal edges 168 of the grounding tabs 150. The teeth 152 are downward facing and configured to interface with the top 36 of the structure 30. The teeth may additionally extend from the side edges 164, 166 in alternative embodiments to interface with the opening edge 42 of the opening 40 of the structure, such as described above with reference to FIG. 6.

Figure 11:
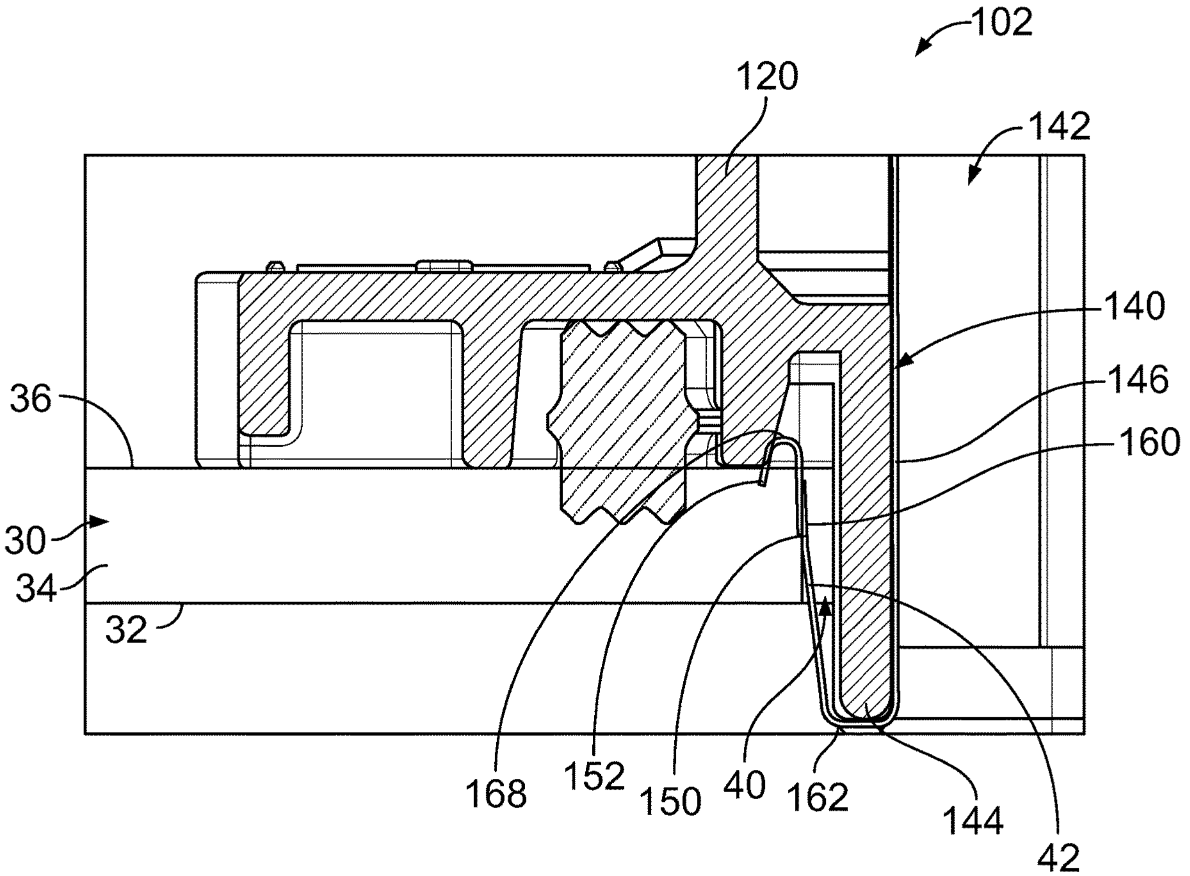
FIG. 11 is a cross-sectional view of a portion of the header connector mounted to the structure showing the electrical shield interfacing with the structure in accordance with an exemplary embodiment.

FIG. 11 is a cross-sectional view of a portion of the header connector 102 mounted to the structure 30 showing the electrical shield 140 interfacing with the structure 30 in accordance with an exemplary embodiment. The electrical shield 140 is grounded to the structure 30. For example, the electrical shield 140 is configured to pierce or cut through the coated surface 32 to directly engage the conductive layer 34 to provide a reliable electrical connection with the structure 30.

The electrical shield 140 is coupled to the header housing 120. In an exemplary embodiment, the electrical shield 140 is located in the header chamber 142. The shield walls 146 of the electrical shield 140 extend along inner surfaces of the walls of the header housing 120 defining the header chamber 142. The shield walls 146 may extend along the interior surface of the lip 144 at the bottom of the header housing 120. In an exemplary embodiment, the grounding tabs 150 extend along the lip 144 of the header housing 120. For example, the connecting portion 162 wraps around the bottom edge of the lip 144 to position the main body 160 of the grounding tab 150 along the exterior of the lip 144. The grounding tab 150 is located between the lip 144 of the header housing 120 and the structure 30. For example, the grounding tab 150 extends into the opening 40 and is located between the opening edge 42 and the header housing 120.

The distal edge 168 of the grounding tab 150 is folded over to interface with the top 36 of the structure. The teeth 152 are provided at the distal edge 168 and press downward into the top 36 of the structure 30 proximate to the opening 40. For example, the teeth 152 are configured to interface with the structure immediately adjacent the perimeter of the opening 40. The teeth 152 are located between the header housing 120 and the top 136 of the structure 30. In an exemplary embodiment, the grounding tab 150 is spring biased downward against the top 36 of the structure 30. For example, the header housing 120 presses the grounding tab 150 downward to press the teeth 152 in a pressing direction toward the structure 30 and allow the cutting edges 154 of the teeth 152 to pierce through the coated surface 32 to directly connect to the conductive layer 34 of the structure 30.

Figure 12:
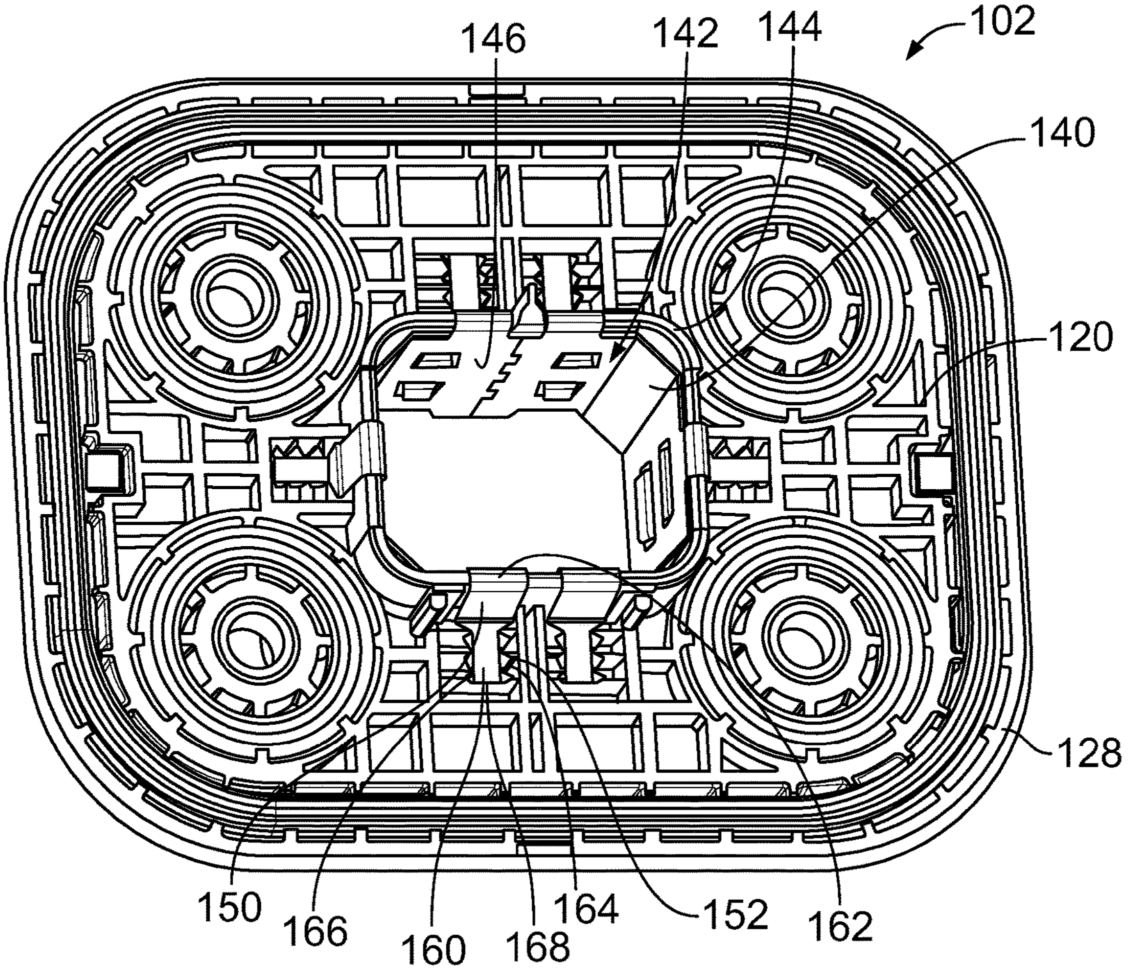
FIG. 12 is a bottom perspective view of a portion of the header connector in accordance with an exemplary embodiment showing the electrical shield coupled to the header housing.

FIG. 12 is a bottom perspective view of a portion of the header connector 102 in accordance with an exemplary embodiment showing the electrical shield 140 coupled to the header housing 120. The electrical shield 140 is configured to be used in the third grounding scheme (FIG. 1C) in the illustrated embodiment.

In an exemplary embodiment, the electrical shield 140 is located in the header chamber 142. The shield walls 146 of the electrical shield 140 extend along inner surfaces of the walls of the header housing 120 defining the header chamber 142. The shield walls 146 extend along the interior surface of the lip 144 at the bottom of the header housing 120. In an exemplary embodiment, the grounding tabs 150 extend along the lip 144 of the header housing 120. For example, the connecting portion 162 wraps around the bottom edge of the lip 144.

The main body 160 extends from the connecting portion 162 of each grounding tab 150. In the illustrated embodiment, the main body 160 is oriented horizontally and extends along the bottom of the flange 128. The grounding tab 150 includes the teeth 152 extending from the side edges 164, 166 of the main body 160. The teeth 152 may additionally extend from the distal edge 168 of the main body 160. The teeth 152 are downward facing and configured to interface with the top 36 of the structure 30. The teeth 152 may additionally extend from the side edges of the connecting portion 162 in alternative embodiments to interface with the opening edge 42 of the opening 40 of the structure, such as described above with reference to FIG. 6.

Figure 13:
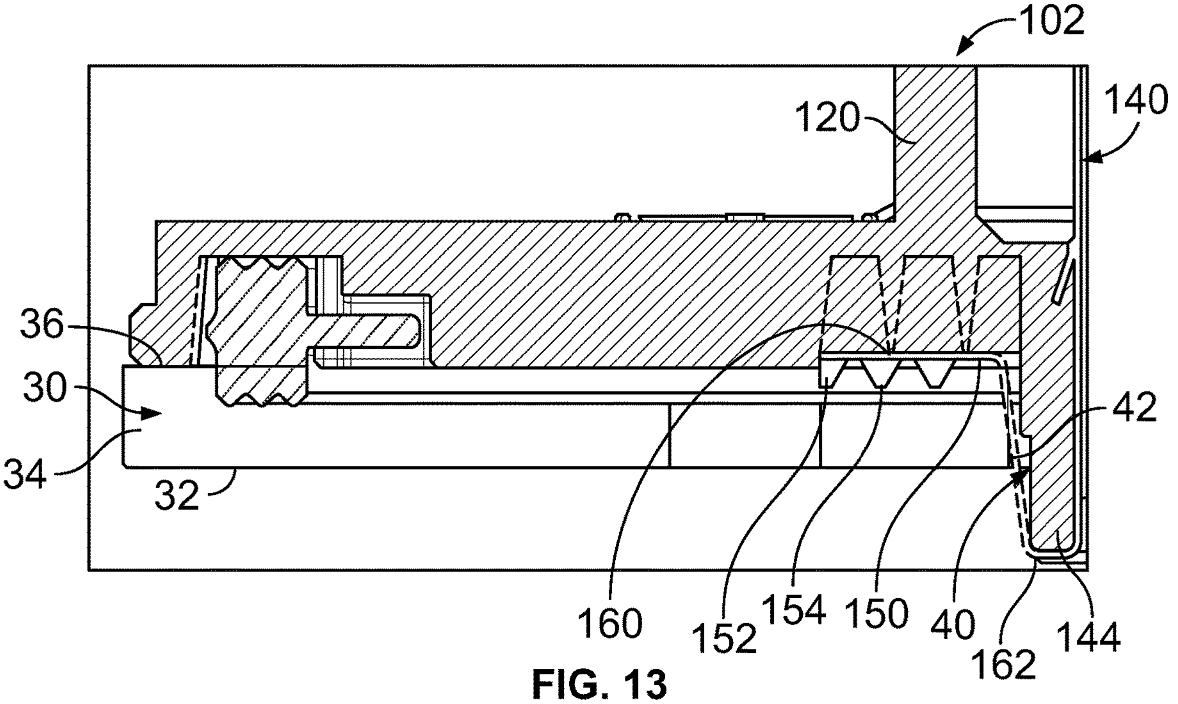
FIG. 13 is a cross-sectional view of a portion of the header connector mounted to the structure showing the electrical shield interfacing with the structure in accordance with an exemplary embodiment.

FIG. 13 is a cross-sectional view of a portion of the header connector 102 mounted to the structure 30 showing the electrical shield 140 interfacing with the structure 30 in accordance with an exemplary embodiment. The electrical shield 140 is grounded to the structure 30. For example, the electrical shield 140 is configured to pierce or cut through the coated surface 32 to directly engage the conductive layer 34 to provide a reliable electrical connection with the structure 30.

In an exemplary embodiment, the grounding tabs 150 extend along the lip 144 of the header housing 120. For example, the connecting portion 162 wraps around the bottom edge of the lip 144 to position the main body 160 of the grounding tab 150 along the exterior of the lip 144. The grounding tab 150 is located between the lip 144 of the header housing 120 and the structure 30. For example, the grounding tab 150 extends into the opening 40 and is located between the opening edge 42 and the header housing 120. The grounding tab 150 extends through the opening 40 to a location above the top 36 of the structure 30. The main body 160 of the grounding tab 150 extends parallel to and along the top 36 of the structure 30, such as between the bottom of the header housing 120 and the structure 30. The teeth 152 extend downward from the main body 160 toward the structure 30. The points of the teeth are configured to interface with the top 36 of the structure 30. In an exemplary embodiment, the grounding tab 150 is pressed downward against the top 36 of the structure 30. For example, the header housing 120 presses the grounding tab 150 downward to press the teeth 152 in a pressing direction toward the structure 30 and allow the cutting edges 154 of the teeth 152 to pierce through the coated surface 32 to directly connect to the conductive layer 34 of the structure 30.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. An electrical connector comprising:

a housing having a mounting end configured to be mounted to a structure, the mounting end of the housing being received in an opening in the structure; and an electrical shield having shield walls surrounding a shield cavity, the shield walls coupled to the housing and providing electrical shielding for the housing, the electrical shield including grounding tabs extending from the shield walls, the grounding tabs including teeth having cutting edges, the grounding tabs being received in the opening in the structure, the teeth of the grounding tabs configured to engage the structure to electrically ground the grounding tabs to the structure, the cutting edges configured to cut through a coated surface of the structure to directly engage a conductive layer of the structure to electrically connect the electrical shield to the structure through the coated surface.

2. The electrical connector of claim 1, wherein the teeth are triangular shaped having a point.

3. The electrical connector of claim 1, wherein each grounding tab includes a plurality of the teeth.

4. The electrical connector of claim 1, wherein each grounding tab includes side edges extending to a distal edge opposite the corresponding shield wall, the teeth extending along the side edges.

5. The electrical connector of claim 4, wherein the teeth extend along the distal edge.

6. The electrical connector of claim 1, wherein the shield walls include a plurality of the grounding tabs.

7. The electrical connector of claim 1, wherein the housing presses the teeth in a pressing direction toward the structure.

8. The electrical connector of claim 1, wherein each grounding tab is located between the housing and the structure.

9. The electrical connector of claim 1, wherein the housing includes a lip surrounding a housing chamber, the lip being received in the opening in the structure, the side walls extending along an interior surface of the lip and facing the housing chamber, the grounding tabs extending along an exterior surface of the lip and facing the structure.

10. The electrical connector of claim 9, wherein each grounding tab is folded around a bottom of the lip.

11. The electrical connector of claim 1, wherein the teeth are bent outward relative to the grounding tab to interface with the structure.

12. The electrical connector of claim 1, wherein the teeth are angled relative to the grounding tab and oriented non-parallel to the grounding tab.

13. The electrical connector of claim 1, wherein the teeth are configured to slide along the structure to pierce through the coated surface.

14. An electrical connector comprising:

a housing having a mounting end configured to be mounted to a top surface of a structure, the mounting end of the housing being received in an opening in the structure defined by an opening edge surrounding a perimeter of the opening and extending between a bottom surface and the top surface of the structure;

a terminal coupled to the housing; and an electrical shield having shield walls surrounding a shield cavity, the shield cavity receiving the terminal, the shield walls coupled to the housing and providing electrical shielding for the terminal, the electrical shield including grounding tabs extending from the shield walls, the grounding tabs including teeth having cutting edges, the grounding tabs being received in the opening in the structure, the teeth of the grounding tabs configured to engage the opening edge between the top surface and the bottom surface of the structure to electrically ground the grounding tabs to the structure, the cutting edges configured to cut through a coated surface of the structure to directly engage a conductive layer of the structure between the top surface and the bottom surface to electrically connect the electrical shield to the structure through the coated surface.

15. The electrical connector of claim 14, wherein each grounding tab includes a plurality of the teeth.

16. The electrical connector of claim 14, wherein each grounding tab includes side edges extending to a distal edge opposite the corresponding shield wall, the teeth extending along the side edges.

17. The electrical connector of claim 14, wherein the housing includes a lip surrounding a housing chamber, the lip being received in the opening in the structure, the side walls extending along an interior surface of the lip and facing the housing chamber, the grounding tabs extending along an exterior surface of the lip and facing the structure.

18. An electrical connector comprising:

a housing having a mounting end configured to be mounted to a top surface of a structure, the mounting end of the housing being received in an opening in the structure defined by an opening edge surrounding a perimeter of the opening;

a terminal coupled to the housing; and an electrical shield having shield walls surrounding a shield cavity, the shield cavity receiving the terminal, the shield walls coupled to the housing and providing electrical shielding for the terminal, the electrical shield including grounding tabs extending from the shield walls, the grounding tabs including teeth having cutting edges, the grounding tabs being received in the opening in the structure, the teeth of the grounding tabs configured to engage the top surface of the structure proximate to the opening edge to electrically ground the grounding tabs to the structure, the cutting edges configured to cut through a coated surface of the structure to directly engage a conductive layer of the structure at the top surface to electrically connect the electrical shield to the structure through the coated surface.

19. The electrical connector of claim 18, wherein each grounding tab includes side edges extending to a distal edge opposite the corresponding shield wall, the teeth extending along the side edges.

20. The electrical connector of claim 18, wherein the housing includes a lip surrounding a housing chamber, the lip being received in the opening in the structure, the side walls extending along an interior surface of the lip and facing the housing chamber, the grounding tabs extending along an exterior surface of the lip and facing the structure.

* * * * *